Patented Apr. 26, 1949

2,468,168

UNITED STATES PATENT OFFICE 2,468,168

5,5-DI-(α-THIENYL)HYDANTOIN AND METHOD FOR OBTAINING SAME

William G. Bywater and William R. Coleman, Grosse Pointe, Mich., assignors to Parke, Davis & Company, Detroit, Mich., a corporation of Michigan No Drawing. Application June 11, 1945, Serial No. 598,906

9 Claims. (Cl. 260—309.5)

This invention relates to 5,5-di-(α-thienyl)-hydantoin and salts thereof and also to methods for obtaining the same.

We have found that 5,5-di-(α-thienyl)hydantoin is produced by heating di-α-thienylketone in the presence of a solvent at least partially miscible with water, with a water-soluble cyanide and ammonium carbonate or an equivalent substance capable of yielding ammonia and carbon dioxide under the conditions of reaction.

The reaction may be illustrated as follows:

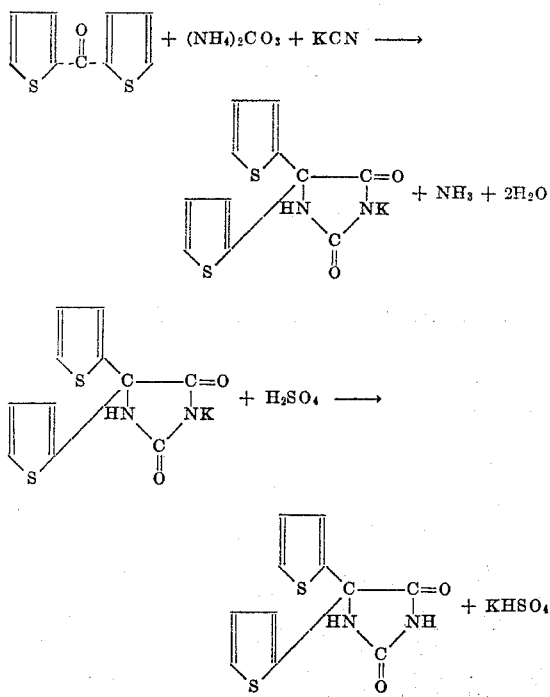

Solvents which we have found to be satisfactory in the practice of our invention are those in which water is soluble at least to the extent of several per cent, although usually we prefer solvents which are completely miscible with water. Such solvents are in general low molecular weight alcohols, amines, esters, ethers and amides. Suitable solvents are ethanol, propanol, ethyl acetate, dioxane, morpholine, pyridine, ethanolamine, diethanolamine, the lower ethers of ethylene glycol such as the mono ethyl ether and the mono methyl ether, ethylene glycol, propylene glycol, acetamide, propionamide, glycerol and the like. We prefer to use solvents boiling above about 100° C.

as the use of such solvents makes it possible to obtain good yields of the 5,5-di-(α-thienyl) hydantoin in shorter periods of time. For instance, when ethanol is used as a solvent about 100 hours of heating is required to bring about a satisfactory degree of reaction while in acetamide (B. P. 222° C.) at a temperature of about 100° C. the reaction takes place to give high yields of the desired product in about fifteen hours.

We have found that acetamide is a particularly valuable solvent in the preparation of the new hydantoin because of its availability and because, as stated above, high yields during a short period of time result from its use.

In general, the reaction should be carried out in a closed vessel to prevent considerable loss of the volatile reactants and the temperature should be maintained between about 75 and 150° C. When operating at the lower temperatures, heating should be continued for at least twenty hours while at the higher temperatures about ten to twelve hours is usually sufficient. When using acetamide as a solvent we prefer to heat the reaction mixture for about fifteen hours at a temperature slightly over 100° C.

We have also found that salts of the new 5,5,-di-(α-thienyl)hydantoin may be prepared by treatment of the hydantoin with an aqueous or alcoholic solution of an alkaline hydroxide such as sodium hydroxide, potassium hydroxide, lithium hydroxide, calcium hydroxide and magnesium hydroxide. These salts may also be prepared by the action of an alcoholic solution of an alcoholate such as sodium methylate, sodium ethylate, potassium ethylate and the like, on the new hydantoin.

The following is the general formula for the new compounds of this invention:

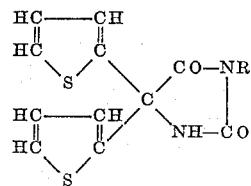

Where R is a member of the class consisting of hydrogen and alkali and alkaline earth metals.

We have found that the new compounds of the present invention are valuable therapeutic products and are particularly effective as anticonvulsants.

The invention is illustrated by the following examples:

Example 1

A mixture consisting of 7.3 g. of di-α-thienylketone [prepared by the method described by Gatterman, Ber., 18, 3013 (1885)], 3.4 g. of potassium cyanide, 11 g. of ammonium carbonate and 92 g. of acetamide is heated in a sealed tube at 110° C. for fifteen hours. The tube is cooled, opened and the contents treated with water, and 10% sodium hydroxide solution is added until the pH of the mixture is about 11. The insoluble, unreacted di-α-thienylketone is removed by filtration and the filtrate acidified with dilute sulfuric acid. The crude precipitated product is removed by filtration and redissolved in dilute sodium hydroxide solution. Carbon dioxide gas is passed into the alkaline solution and the 5,5-di-(α-thienyl) hydantoin which separates is collected by filtration, washed with water and dried in the air.

The product is purified further by dissolving it in hot 50% water-alcohol mixture, treating the solution with charcoal and filtering. The filtrate is diluted with water and on cooling the pure, 5,5-di-(α-thienyl) hydantoin separates as white needles, M. P. 225–6° C.

Anal.

Calc'd. for $C_{11}H_8O_2S_2N_2$: N, 10.59%
Found: N, 10.85; 10.87

The recovered unreacted di-α-thienylketone may be purified by recrystallization from benzene and from absolute alcohol to yield the pure material, M. P. 90–91° C., which may be used again in the preparation of 5,5-di-(α-thienyl) hydantoin.

Instead of using potassium cyanide as described in the above example, we may employ other water-soluble cyanides such as sodium cyanide, calcium cyanide or lithium cyanide. However, we prefer to use alkali metal cyanides because of their availability.

Instead of using ammonium carbonate as shown in the above example, we may also use other equivalent sources of carbon dioxide and ammonia. For example, ammonia gas and carbon dioxide gas may be pumped into an autoclave containing the mixture of di-α-thienylketone, the organic solvent and the water-soluble cyanide and the mixture heated and the product isolated as described hereinbefore. Ammonium carbamate may also be used as a source of ammonia and carbon dioxide.

Where we use the term ammonium carbonate, it is to be understood that it refers to the article of commerce designated by that name, which however is considered in reality to be a mixture of ammonium bicarbonate and ammonium carbamate.

Example 2

5 g. of 5,5-di-(α-thienyl) hydantoin is dissolved in 30 ml. of absolute ethanol and added to a solution of 0.83 g. of sodium hydroxide in 15 ml. of absolute alcohol with rapid stirring. The mixture is concentrated to a volume of 25 ml. in a stream of carbon dioxide-free warm air, the white sodium salt of 5,5-di-(α-thienyl) hydantoin is removed by filtration and purified by recrystallization from a small amount of water or from water-alcohol mixture.

Example 3

5 g. of 5,5-di-(α-thienyl) hydantoin is added to a hot solution of 1.1 g. of potassium hydroxide in 20 ml. of water. The hot mixture is treated with a small amount of decolorizing carbon, filtered and the filtrate cooled to 0° C. The cooled solution is evaporated to dryness in vacuo to obtain a potassium salt of 5,5-di-(α-thienyl) hydantoin.

In a similar manner the calcium and magnesium salts of 5,5-di-(α-thienyl) hydantoin may be prepared by the use of calcium or magnesium hydroxide in the above example.

We claim:

1. A compound having the formula,

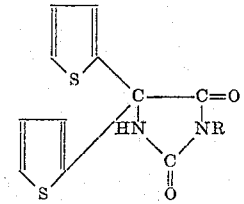

where R is a member of the group consisting of hydrogen and alkali and alkaline earth metals.

2. 5,5-di-(α-thienyl) hydantoin having the formula,

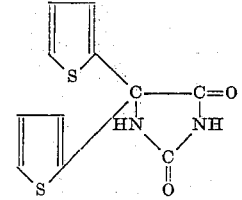

3. A compound having the formula,

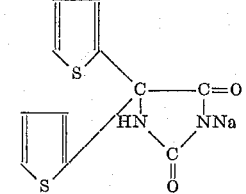

4. A compound having the formula,

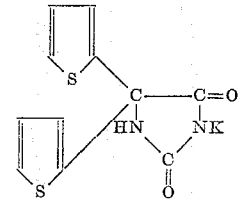

5. The process which comprises reacting the di-α-thienyl ketone at 75 to 150° C. with a water soluble cyanide and ammonium carbonate in the presence of a solvent at least partially miscible with water, acidifying the reaction mixture and separating the 5,5-di-(α-thienyl) hydantoin thus produced.

6. The process which comprises reacting di-α-thienylketone at 75 to 150° C. with a water-soluble cyanide and ammonium carbonate in the presence of a solvent at least partially miscible with water and for a time ranging from at least 20 hours at a temperature of 75° C. to at least 10 hours at a temperature of 110° C., acidifying the reaction mixture and separating the 5,5-di-(α-thienyl) hydantoin thus produced.

7. The process which comprises reacting di-α-thienylketone with a water-soluble cyanide and ammonium carbonate in acetamide for at least 15 hours at about 110° C., diluting the reaction mixture with water, acidifying the mixture and separating the 5,5-di-($\alpha$-thienyl) hydantoin thus produced.

8. The process which comprises reacting di-$\alpha$-thienylketone with a water soluble cyanide and ammonium carbonate in propylene glycol for at least 15 hours at about 110° C., diluting the reaction mixture with water, acidifying the mixture and separating the 5,5-di-($\alpha$-thienyl) hydantoin thus produced.

9. The process which comprises reacting di-($\alpha$-thienyl) hydantoin with an alkaline reagent selected from the class consisting of alkali metal hydroxides, alkaline earth hydroxide and alkali metal alcoholates and separating the salt of di-($\alpha$-thienyl) hydantoin thus produced.

WILLIAM G. BYWATER.
WILLIAM R. COLEMAN.

REFERENCES CITED

The following references are of record in the file of this patent:

UNITED STATES PATENTS

| Number | Name | Date |
|---|---|---|
| 2,366,221 | Spurlock | Jan. 2, 1945 |